(12) United States Patent
Bartsch et al.

(10) Patent No.: US 6,823,285 B1
(45) Date of Patent: Nov. 23, 2004

(54) MEASURING DEVICE WITH A MEASURING MODULE AND A CLOCK

(75) Inventors: Udo Bartsch, Huglfing (DE); Klaus Deuter, Unterschleissheim (DE); Alois Dorfmeister, Dachau (DE); Michael Just, München (DE); Jochen Körner, München (DE); Otto Krestel, Utting (DE); Otto Rzehak, München (DE); Juliane Schuster, Karlsfeld (DE); Michael Schweigert, München (DE)

(73) Assignee: LRE Technology Partner GmbH, Munich (DE)

( * ) Notice: Subject to any disclaimer, the term of this patent is extended or adjusted under 35 U.S.C. 154(b) by 0 days.

(21) Appl. No.: 09/212,442

(22) Filed: Dec. 16, 1998

(30) Foreign Application Priority Data

Dec. 23, 1997 (DE) .................................. 297 22 809 U

(51) Int. Cl.[7] .......................... G04F 1/00; G04F 10/00
(52) U.S. Cl. ........................................ 702/178
(58) Field of Search ............................... 702/178, 176, 702/160; 73/1.43, 1.44, 1.45, 1.46, 1.49, 1.52; 368/47, 11, 155, 101, 110

(56) References Cited

U.S. PATENT DOCUMENTS

| | | | | |
|---|---|---|---|---|
| 4,371,945 A | * | 2/1983 | Karr et al. | 702/160 |
| 4,409,669 A | * | 10/1983 | Neumann et al. | 712/36 |
| 4,578,769 A | * | 3/1986 | Frederick | 702/160 |
| 4,637,403 A | * | 1/1987 | Garcia et al. | 600/583 |
| 4,763,284 A | * | 8/1988 | Carlin | 702/41 |
| 4,774,679 A | * | 9/1988 | Carlin | 702/41 |
| 5,050,142 A | | 9/1991 | Gibbs | |
| 5,136,285 A | * | 8/1992 | Okuyama | 340/870.11 |
| 5,231,612 A | * | 7/1993 | Allgaier et al. | 368/47 |
| 5,287,520 A | * | 2/1994 | Kaiser | 710/110 |
| 5,485,402 A | * | 1/1996 | Smith et al. | 702/160 |
| 5,536,249 A | | 7/1996 | Castellano et al. | |
| 5,650,945 A | * | 7/1997 | Kita | 702/1 |
| 5,748,148 A | * | 5/1998 | Heiser et al. | 342/457 |
| 5,777,950 A | * | 7/1998 | Helm et al. | 368/47 |
| 5,802,545 A | * | 9/1998 | Coverdill | 701/35 |
| 5,859,595 A | * | 1/1999 | Yost | 219/432 |
| 5,862,803 A | * | 1/1999 | Besson et al. | 600/508 |
| 5,917,429 A | * | 6/1999 | Otis, Jr. et al. | 340/870.31 |
| 6,122,960 A | * | 9/2000 | Hutchings et al. | 73/493 |

FOREIGN PATENT DOCUMENTS

| | | | |
|---|---|---|---|
| DE | 34 46 034 | 6/1986 | ............ G01D/11/26 |
| DE | 36 13 889 | 10/1987 | ............ A61B/5/02 |
| DE | 37 05 835 | 9/1988 | ............ G01P/1/07 |
| DE | 40 09 522 | 1/1992 | ............ G07C/11/00 |
| DE | 40 36 994 | 5/1992 | ............ G01D/11/24 |
| DE | 41 00 543 | 7/1992 | ............ G04B/47/06 |
| DE | 43 15 532 | 11/1993 | ............ G01D/1/00 |
| DE | 43 12 583 | 2/1995 | ............ G01C/23/00 |
| DE | 44 03 753 | 7/1995 | ............ G06K/19/07 |
| DE | 195 10 416 | 9/1996 | ............ G01D/5/00 |
| DE | 195 11 456 | 10/1996 | ............ G09F/9/00 |
| DE | 44 25 708 | 4/1997 | ............ A61M/5/168 |
| DE | 195 36 314 | 4/1997 | ............ G04C/11/02 |
| DE | 195 43 909 | 5/1997 | ............ G06K/19/07 |
| DE | 196 06 458 | 8/1997 | ............ G01D/1/00 |

* cited by examiner

Primary Examiner—John Barlow
Assistant Examiner—Demetrius Pretlow
(74) Attorney, Agent, or Firm—McCormick, Paulding & Huber LLP

(57) ABSTRACT

A measuring system having a clock and a plurality of measuring modules, each of the measuring modules having a data processing unit, a data input unit, and an indicator unit for providing at least one measuring function. The system also includes a releasable coupler for no-galvanically coupling a selected one of the measuring modules with the clock for the transmission of data between the clock and the selected measuring module. Each of the measuring modules can be selectively coupled to the clock by means of the coupler to provide a measuring function associated with the coupled module in accordance with time data provided by the clock. The system can include a housing for supporting the selected measuring module and the clock. The measuring modules can be configured to measure various parameters of a human body or the environment.

20 Claims, 2 Drawing Sheets

MEASURING DEVICE WITH A MEASURING MODULE AND A CLOCK

FIELD OF THE INVENTION

The invention concerns a measuring device including a measuring module with a data processing unit, a data input unit, and an indicating unit, as well as a clock.

BACKGROUND OF THE INVENTION

One such measuring device is known for example from U.S. Pat. No. 5,536,249. In the there described device a clock chip is provided in the measuring module and connected to the processor of the module. The time delivered from the clock chip can be indicated on the display screen of the measuring module. A disadvantage of this solution is that the clock cannot be used separately and also cannot be combined with another type of measuring device.

The invention has as its object the provision of a measuring device of the aforementioned kind, making possible a greater flexibility in regard to the use of the clock in combination with a measuring module.

SUMMARY OF THE INVENTION

This object is solved in accordance with the invention in that the clock is a unit galvanically separated from the measuring module and in that the measuring device has means for non-touchingly obtaining the time data indicated by the clock and for transmitting such data to the measuring module.

In the solution according to the invention, the clock is not only an internal clock chip but also is a stand-alone, usable, complete clock which can be used in combination with the measuring module, or instead as the case may be without such measuring module, and which as the case may be is combinable with several measuring modules for measuring different parameters.

The clock can have a type of stop-clock function in that the time indication of the clock at the beginning of a measurement can selectively be set to a pre-given null point, and after the ending of the measurement, is resetable to the actual time.

The clock can have an analog time indicator with hands, wherewith the means for obtaining the time obtains the positions of the hands. Such an obtaining of the hand positions can, for example, be accomplished by use of a suitable optical means, such as a photo sensor assembly for detecting emitted or reflected light or a sensor working with the ambient light.

In the measuring device of the invention a clock with an LCD screen or with a digital indicator can also be used, wherein the LCD screen is selectably switchable to dark and the measuring module has a counter triggerable by a sensor sensing the LCD screen.

In another embodiment of the invention the means for obtaining and transmitting the time data includes a device for wirelessly transmitting the data and having at least one transmitter in the clock and at least one receiver in the measuring module. Such a transmission link can work with optical signals, radio signals or infrared signals. Also, an ultrasonic transmission link can be used for the data transmission.

In a preferred embodiment the measuring module is releasably connected with the clock so that the measuring module need be connected with the clock only as needed. Such a connection can be achieved in a simple way in that the measuring module is clippable onto the clock. Such a solution is especially advantageous if under different conditions different measurements with the different measuring modules are to be carried out or if the measuring module is needed only from time to time.

If on the other hand a measuring module is permanently needed, as for example is the case for blood sugar measurements for diabetic persons, it can be advantageous if the clock and the measuring module are arranged together in a common housing. In all events the measuring device can be so formed that it can be carried on a wrist by means of an arm band which is arranged either on the clock or on the common housing for the clock and measuring module.

The measuring module can be made for different functions. For example, the measuring module can be made for the measurement of parameters of the human body such as for the measurement of blood sugar, of the LH-value, of estrogen concentration, of the heart frequency, of the pulse beat and the blood pressure, of the body temperature, and of the skin moisture. Likewise the measuring module can be made for the carrying out of a peak flow measurement for asthma patients or for recording a short EKG sequence. Other values obtainable with such a measuring module are, for example, environmental parameters such as air pressure, the ambient temperature, the UV radiation, the geographic altitude or the contamination of the air by bacteria, poisons, and gases. Also, several of the previously-mentioned measuring functions can be joined into one measuring module.

In a further embodiment of the invention the data processing unit of the measuring module has a memory accessible through the data input unit, thereby there can be stored in the measuring module, for example, a PIN number, a check card number or other important data for the user. It is also possible to so program the data processing unit that it interrogates the memory at pre-determined intervals and, for example, enables an alarm unit to produce an alarm signal if the user is to be reminded of the taking of certain medicines or of the need to give attention to the lapsing of certain periods of time. In connection with this the data processing unit can also be connected with a speech module.

In order to increase the utility of the inventive measuring device the measuring module, that is the data processing unit and the data input unit, can be formed to carry out calculation functions so that the measuring device of the invention can also be used as a pocket calculator.

The measuring module can also be formed for the carrying out of supervisory functions, such as for example, for the control of watch people in which case the inventive measuring device can be replaced by a plug-in clock; or for legitimizing the user for different purposes.

According to a further embodiment, the measuring module has a radio receiver in order, for example, to be able to receive specific alarm signals. This receiver can also be used for determining the geographical position of the carrier of the measuring device.

According to a preferred embodiment of the invention, the measuring module is formed to indicate the amount and the application time point of a medicine so that the measuring device can be used not only for analysis but also for the purpose of therapy.

Further features and advantages of the invention will be apparent from the dependent claims and from the following description which in connection with the accompanying drawings explain the invention by way of exemplary embodiments.

DETAILED DESCRIPTION OF THE PREFERRED EMBODIMENTS

Figure 1:
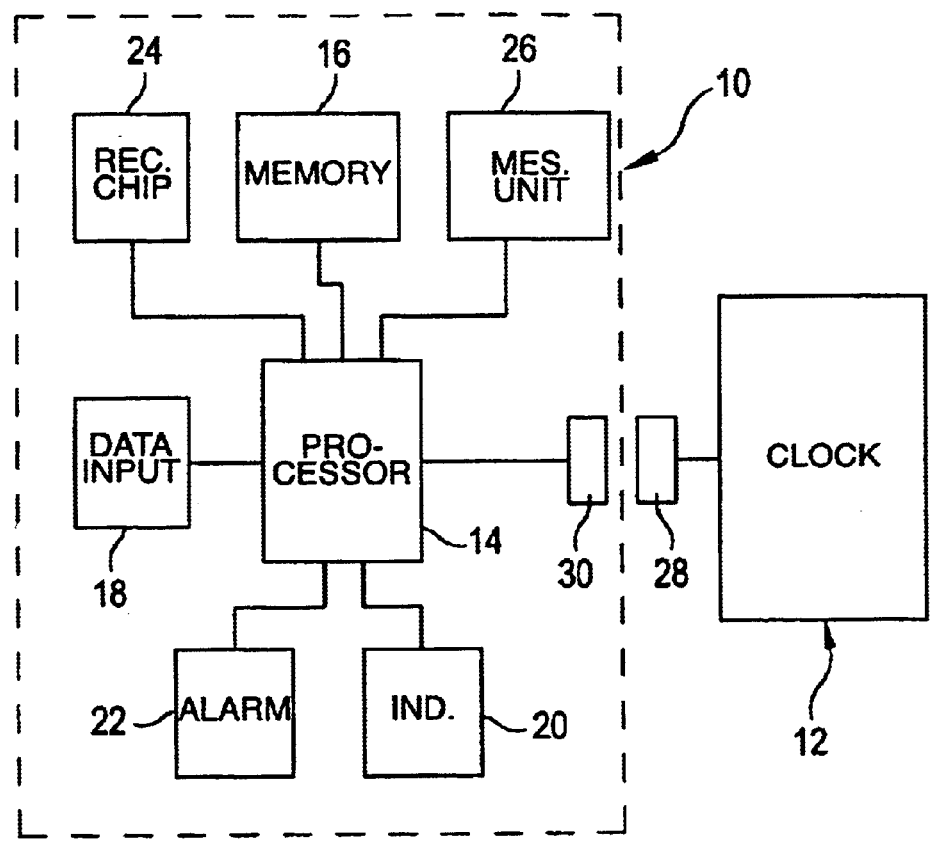
FIG. 1 a schematic block diagram of a measuring device according to the invention.

FIG. 1 shows the essential elements of a measuring device according to the invention and having a measuring module indicated generally at 10 and a clock indicated generally at 12. The measuring module contains a processor 14, serving as a data processing device, which is connected with a memory 16, a data input unit 18, and an indicator unit 20. Moreover the processor 14 is connected with an alarm 22 and a receiving chip 24. The receiving chip 24 can be formed to receive different signals. As the case may be, the receiver 24 can also be combined with an associated transmitter.

Finally, the processor 14 is connected with a measuring unit 26, which is formed to suit the existing measuring purpose, in order for example, to obtain the above-described parameters of a human body or of the environment.

The clock 12 is a customary clock, for example a digital clock, with its own clock works and the therewith associated time indicator. In the illustrated embodiment, the clock 12 is coupleable with the processor 14 of the measuring module 10 over an optical coupler 28,30. The transmission link can thereby be so formed that on one hand the time data from the clock 12 can be transmitted to the processor 14, and on the other hand, control data can also be transmitted from the processor to the clock, in order for example, to set the clock at the beginning of a measurement to a pre-given null point and after the carrying out of the measurement to again reset the clock to the actual time.

Figure 2:
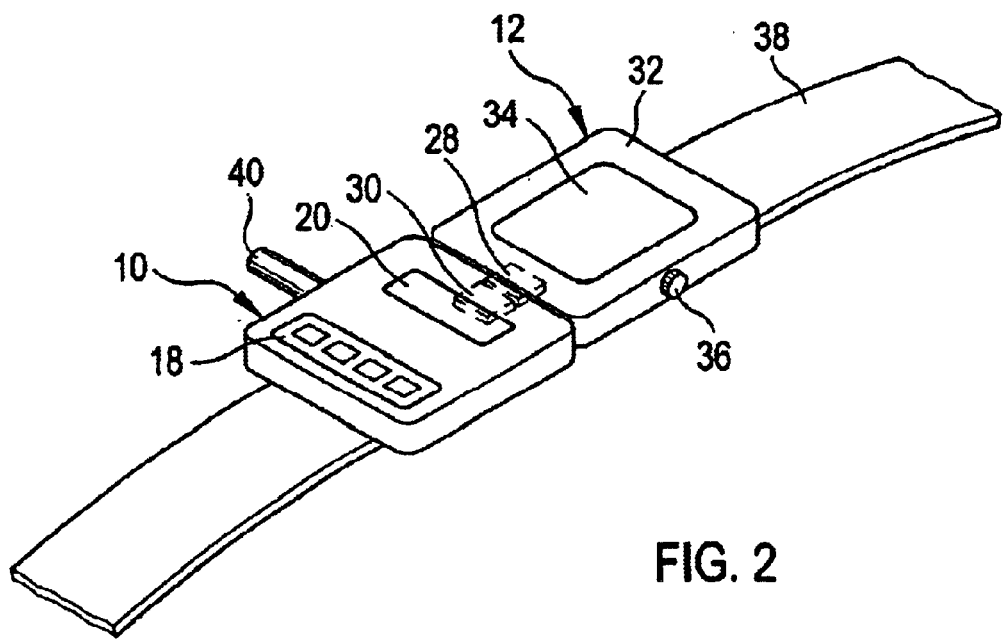
FIG. 2 a schematic perspective view of an arm band clock with a clip-on measuring module.

FIG. 2 shows, in schematic way, a practical embodiment of the measuring device described by way of FIG. 1. FIG. 2 shows the clock 12 with a housing 32, an indicator 34, and at least one operating element 36. On the clock housing 32 is arranged an arm band 38. The measuring module 10 is also further so fastened to the arm band 38 that the optical couplers 28,30 of the two units lie opposite to one another. The measuring module 10 can, for example, be formed as a measuring device for the evaluation of test strips 40.

Figure 3:
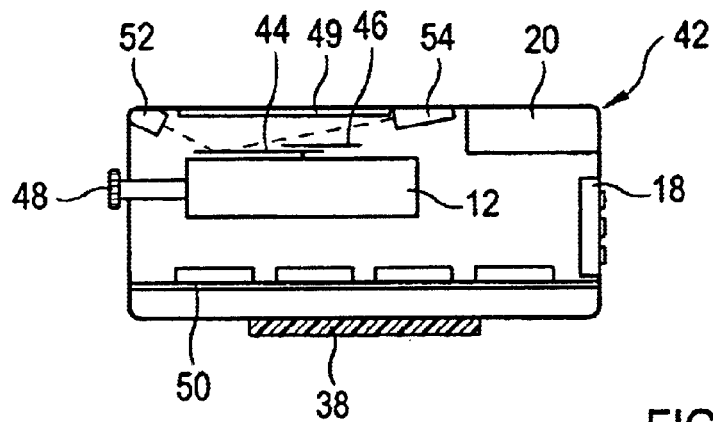
FIG. 3 a sectional view through a second embodiment of the invention, in which the measuring module and the clock are arranged in a common housing.

FIG. 3 shows a schematic section through a further embodiment of the invention wherein parts which are similar to those of the embodiment of FIGS. 1 and 2 have been provided with the same reference numbers.

In the embodiment illustrated in FIG. 3 the clock 12 and the measuring module are arranged in a common housing 42. The clock 12 is a clock with an analog indicator, that is a number dial 43 and hands 44,46 and can be operated by a crown 48 extending out of the housing 42. In the housing 42 is a window 49 through which the dial and the hands 44,46 of the clock 12 can be observed. In another embodiment of the invention, the clock 12 has a dial having a holographic pattern printed on at least a part of the dial.

The measuring module includes a small plate 50 on which the processor 14 and other essential parts of the measuring module are arranged. The input unit 18 is located in one side of the housing and the indicator unit 20 is arranged on the upper face of the housing. The arm band 32 is located at the under face of the housing.

The positions of the hands 44,46 are obtained, for example, through a reflected light sensor assembly including a light source 52 and a receiver 54. The light emitted from the light source 52 is in a certain position of the hour hand 46 reflected into the receiver 54 so that at this position a certain null point can be established. Also in this solution, the clock and the measuring module are units entirely separated from one another. The light source 52 can also be omitted. Instead of it, the daylight or the ambient light can be used for the same purpose.

Figure 4:
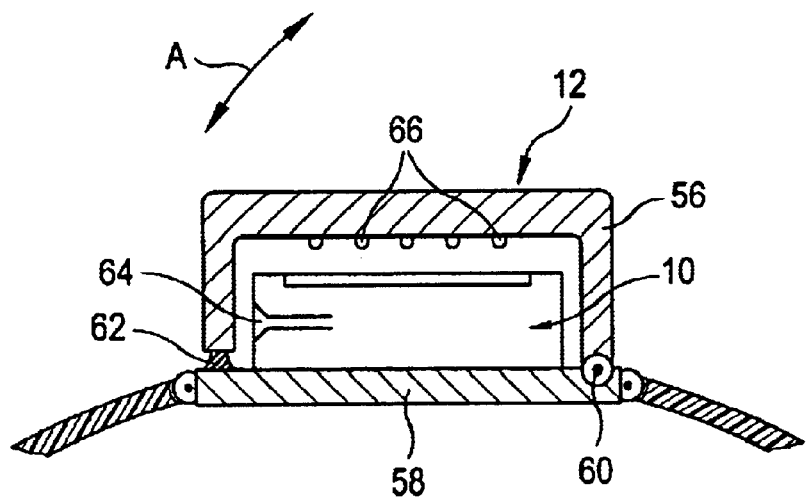
FIG. 4 a schematic section through a third embodiment of the invention.

FIG. 4 shows a modified embodiment in which the clock 12 is arranged in a pot-shaped housing which is linked to a plate 58 connected with the measuring module 10 so that the clock housing 56 can be pivoted about the pivot axis 60 in the direction of the double arrow A in FIG. 4 relative to the measuring module 10. Between the edge of the housing 56 and the plate 58, a seal 62 is provided. As one will recognize, the pot-shaped housing 56 in its closed position of FIG. 4 covers a measuring opening 64 of the measuring module 10 into which opening 64 the test strip 40 is insertable.

On the inner side of the clock housing 56 are provided contact elements or contact pads 66 which stand in connection with the data processing unit of the measuring module 10 and through which a data transmission can take place to an external device, for example a data exchange with the external device. Such an external device can, for example, be a memory chip which is inserted into the pot-shaped housing 56 so that the contacts of the memory chip come into connection with the contact elements 66 in order to make possible such a data transfer.

Instead of the illustrated contact pads, plug contacts can also be provided for connection to an external device for a data exchange. The contact pads can also be arranged on the measuring module 10.

Figure 5:
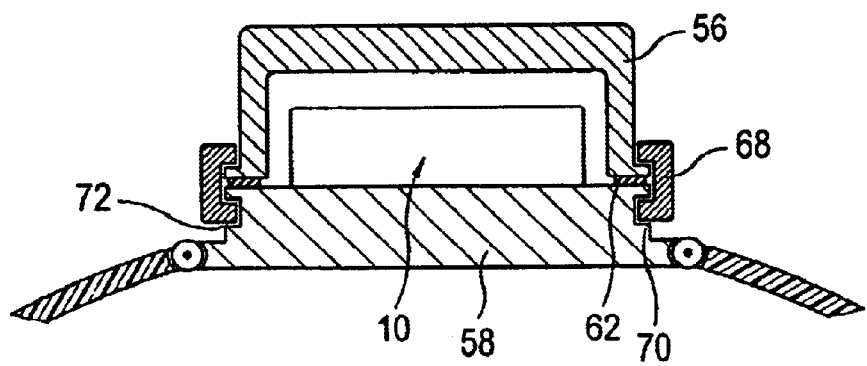
FIG. 5 a schematic section through a fourth embodiment of the invention.

FIG. 5 shows a modified embodiment which largely agrees with the embodiment of FIG. 4 and in which the clock housing 56 is not linked to the plate 58, the clock housing instead carrying a ring 68 which by way of a type of bayonet connection with projections 70 is received in a groove 72 on the measuring module 10 having a corresponding control surface, so that by a rotation of the ring 68 the housing 56 is pressed against the plate 58 of the measuring module 10. The seal 62 thereby serves to provide an entirely sealed closure.

What is claimed is:

1. A portable measuring system comprising:
    a clock providing time of day data, the clock having a wristband coupled thereto;
    a plurality of measuring modules, each of the measuring modules having a data processing unit, a data input unit, and an indicator unit, each said measuring module providing at least one measurement function;
    a releasable coupler for non-galvanically coupling a selected one of the measuring modules with the clock for the transmission of data between the clock and the selected measuring module; and whereby
    each of the measuring modules can be selectively coupled to the clock by means of the coupler to provide a measuring function associated with the coupled module in accordance with time data provided by the clock.

2. The measuring system as defined in claim 1 further comprising a housing wherein the clock and the selected measuring module are supported in the housing.

3. The measuring system as defined in claim 1 wherein the clock further comprises a time indicator which is selectively settable to a null point and which, after the ending of a measurement, is re-settable to the actual time.

4. The measuring system as defined in claim 1 wherein in the clock is an analog time indicator having hands and the coupler includes means to obtain the time data therefrom.

5. The measuring system as defined in claim 4 wherein the means for obtaining time data from the clock includes optically obtaining the hand positions.

6. The measuring system as defined in claim 1 wherein the clock further comprises a digital indicator having an LCD screen, the LCD screen being selectively switchable to dark, and wherein the selected measuring module includes a counter triggerable by a sensor coupled to the LCD screen.

7. The measuring system as defined in claim 1 wherein the coupler further comprises a device for wirelessly transmitting the data by way of at least one transmitter in the clock and/or at least one receiver in the measuring module.

8. The measuring system as defined in claim 2 wherein the wristband is coupled to the housing.

9. The measuring system according to claim 1 wherein at least one of the measuring modules further comprises a memory coupled to both the data processing and the data input units thereof.

10. The measuring system according to claim 1 wherein at least one of the measuring modules includes an alarm device.

11. The measuring system according to claim 1 wherein at least one of the measuring modules is configured for the carrying out of calculation functions.

12. The measuring system according to claim 1 wherein at least one of the measuring modules is configured for the carrying out of supervisory functions.

13. The measuring system according to claim 1 wherein at least one of the measuring modules is configured to indicate the amount and the application time point of a medicine.

14. The measuring system according to claim 1 wherein at least one of the measuring modules includes a radio receiver.

15. The measuring system according to claim 1 wherein at least one of the measuring modules includes a speech module coupled to the data processing unit.

16. The measuring system according to claim 1 wherein at least one of the measuring modules includes a contact surface coupled to the data processing unit for data exchange with an external device.

17. The measuring system according to claim 16 wherein the at least one measuring module further comprises an alarm device coupled to the data processing unit wherein the alarm device can be actuated when a data exchange is ended.

18. The measuring system according to claim 1 wherein at least one of the measuring modules is configured to provide an analysis of a body fluid.

19. The measuring system according to claim 1 wherein at least one of the measuring modules is configured to measure a parameter of a human body.

20. The measuring system according to claim 1 wherein at least one of the measuring modules is configured to measure a parameter of the environment.

* * * * *